(12) United States Patent
Piatek

(10) Patent No.: US 6,517,002 B1
(45) Date of Patent: Feb. 11, 2003

(54) SYSTEM AND METHOD FOR INTELLIGENT DATA INPUT FROM A MACHINE-READABLE MEDIUM

(75) Inventor: John T. Piatek, Traverse City, MI (US)

(73) Assignee: Portable Data Technologies, Inc., Traverse City, MI (US)

(*) Notice: Subject to any disclaimer, the term of this patent is extended or adjusted under 35 U.S.C. 154(b) by 0 days.

(21) Appl. No.: 09/232,933

(22) Filed: Jan. 19, 1999

Related U.S. Application Data

(60) Provisional application No. 60/079,485, filed on Mar. 26, 1998.

(51) Int. Cl.[7] .......................... G06F 17/00; G06F 19/00; G06K 7/10
(52) U.S. Cl. ................................. 235/462.15; 235/375
(58) Field of Search ................................. 235/380, 375, 235/383, 385, 462.13, 462.15, 462.1; 395/326; 707/3, 4, 5, 12; 705/28

(56) References Cited

U.S. PATENT DOCUMENTS

| | | | | |
|---|---|---|---|---|
| 5,570,412 A | * | 10/1996 | LeBlanc | 379/58 |
| 5,895,464 A | * | 4/1999 | Bhandari et al. | 707/3 |
| 5,933,829 A | | 8/1999 | Durst et al. | |
| 6,073,114 A | * | 6/2000 | Perkins, III et al. | 705/28 |

* cited by examiner

Primary Examiner—Karl D. Frech
(74) Attorney, Agent, or Firm—Price, Heneveld, Cooper, DeWitt & Litton

(57) ABSTRACT

A system and method are provided for populating a database and/or software screen in a computer with data read from portable high-capacity machine-readable media. The method of the present invention includes the steps of: loading and executing an interpretive software program in the computer; reading a portable high-capacity machine-readable medium with a reading device coupled to the computer; and using the interpretive software program to identify any qualifier character that is present in the data read from the machine-readable medium, ignore the data if no qualifier character is identified, and populate the database and/or software screen with the data read from the machine-readable medium if a qualifier character is identified. The method may additionally, or alternatively, include the step of using the interpretive software program to identify any instructor characters that are present in the data read from the machine-readable medium, identify a data field within the database and/or software screen that corresponds to each identified instructor character, and populate the identified data field with data in the machine-readable medium that follows the corresponding instructor character.

19 Claims, 3 Drawing Sheets

SYSTEM AND METHOD FOR INTELLIGENT DATA INPUT FROM A MACHINE-READABLE MEDIUM

CROSS-REFERENCE TO RELATED APPLICATION

This application claims priority under 35 U.S.C. §119(e) on U.S. Provisional Application No. 60/079,485 entitled "SYSTEM AND METHOD FOR INTELLIGENT DATA INPUT FROM A MACHINE READABLE MEDIUM," filed on Mar. 26, 1998, by John T. Piatek, the entire disclosure of which is incorporated herein by reference.

BACKGROUND OF THE INVENTION

The present invention generally relates to a data input method which allows for two-dimensional bar codes, RFID tags and chips, and other high-capacity machine-readable media to populate any database and/or software "screens," even though these databases and screens have dissimilar data field formats (dissimilar in both the type and order of information required). More particularly, the present invention relates to a method of intelligent data input using an interactive process between machine-readable media and translation software.

Databases and/or computer screens are generally populated by manual keyboard entry whereby a data entry operator manually enters data into the appropriate data field of the database or screen by key strokes on a computer keyboard. Because such manual data entry is a very labor-intensive task, alternative methods for data entry have been developed in which the data is input from bar codes and/or other machine-readable media. The current state-of-the-art for data input from bar codes and other machine-readable media to databases/screens includes three methods: (1) keyboard wedge placement and input, (2) serial transmission, and (3) data identification.

The first method uses what is known as keyboard wedge placement and input whereby the operator manually places the computer's cursor in the data field to be populated and then scans a bar code that fills in this field so as to emulate keystrokes. While this method eliminates the need for an operator to manually enter the data into selected data fields, it still requires the operator to manually select each data field and to populate each data field one at a time.

The second method utilizes serial transmission to automatically populate multiple data fields without requiring human intervention or selection of the data fields once the serial transmission is initiated. This method, however, requires that the host software (i.e., the database program) be specially modified or programmed so that when it sees data coming in from a specific communication port (i.e., where a scanner is connected), the host software directs that information to the appropriate data field.

The third method utilizes data identifiers. Using this method, the data, typically sent via file transfer, has special data identifiers (e.g., ASCII characters) that the host software recognizes and performs translation functions to reformat this data and/or to direct this data to the appropriate data field. However, like the second method, the host software must be specially constructed or modified to recognize data identifiers and perform the translation and/or placement functions. Such special modifications to the host software may render it unusable for maintaining other databases.

SUMMARY OF THE INVENTION

Accordingly, it is an aspect of the present invention to provide a method for populating a database or screen that overcomes the above problems by automating the "placement" and "translation" functions without requiring any modification to the host software (database or screen). Another aspect of the present invention is to provide a method whereby any existing or off-the-shelf database software can be "front-ended" with portable high-capacity machine-readable media, such as two-dimensional bar codes, without requiring custom modification of the database software. An additional aspect of the invention is to provide a method and system for populating a database and/or software screen in a computer, where the data read from a portable high-capacity machine-readable medium may be reformatted in one or more different ways in accordance with characters contained within the machine-readable medium.

To achieve these and other aspects and advantages, a method (or system) of the present invention populates a database and/or software screen in a computer with data read from portable high-capacity machine-readable media by performing the steps of: loading and executing an interpretive software program in the computer, reading a portable high-capacity machine-readable medium with a reading device coupled to the computer, and using the interpretive software program to identify any instructor characters that are present in the data read from the machine-readable medium, and reformat the data in the machine-readable medium that follows the corresponding instructor character in a manner associated with the instructor character.

An additional aspect of the present invention is to provide a method for populating a database and/or software screen in a computer with data read from a portable high-capacity machine-readable medium, such that the data may populate data fields within the database that are specified in characters contained in the machine-readable medium. To achieve this and other aspects and advantages, the method of the present invention comprises the steps of:

loading and executing an interpretive software program in the computer; reading a portable high-capacity machine-readable medium with a reading device coupled to the computer; and using the interpretive software program to identify any instructor characters that are present in the data read from the machine-readable medium, identify a data field within the database and/or software screen that corresponds to each identified instructor character, and populate the identified data field with data in the machine-readable medium that follows the corresponding instructor character.

Still another aspect of the present invention is to provide a method for populating a database and/or software screen in a computer with data read from a portable high-capacity machine-readable medium, where the data may be accepted or rejected based upon the presence of a special character contained in the machine-readable medium. To achieve this and other aspects and advantages, the method of the present invention comprises the steps of: loading and executing an interpretive software program in the computer; reading a portable high-capacity machine-readable medium with a reading device coupled to the computer; and using the interpretive software program to identify any qualifier character that is present in the data read from the machine-readable medium, ignore the data if no qualifier character is identified, and populate the database and/or software screen with the data read from the machine-readable medium if a qualifier character is identified.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

The method of the present invention utilizes intelligence embedded in a portable high-capacity machine-readable medium and an intermediary software program called an INTERPRETIVE SOFTWARE PROGRAM (ISP). The ISP is loaded into the host system prior to any scanning function. The intelligence embedded in the bar code is the form of special ASCII characters called a QUALIFIER or an INSTRUCTOR CHARACTER as described further below. The machine-readable medium is preferably provided in the form of a two-dimensional symbology, particularly a PDF417 two-dimensional bar code. PDF417 bar codes are preferred due to the large amount of data that may be stored in a relatively small area, as well as the ability to build redundancy and error checking into the symbology and thereby provide consistent and accurate results.

Figure 1:
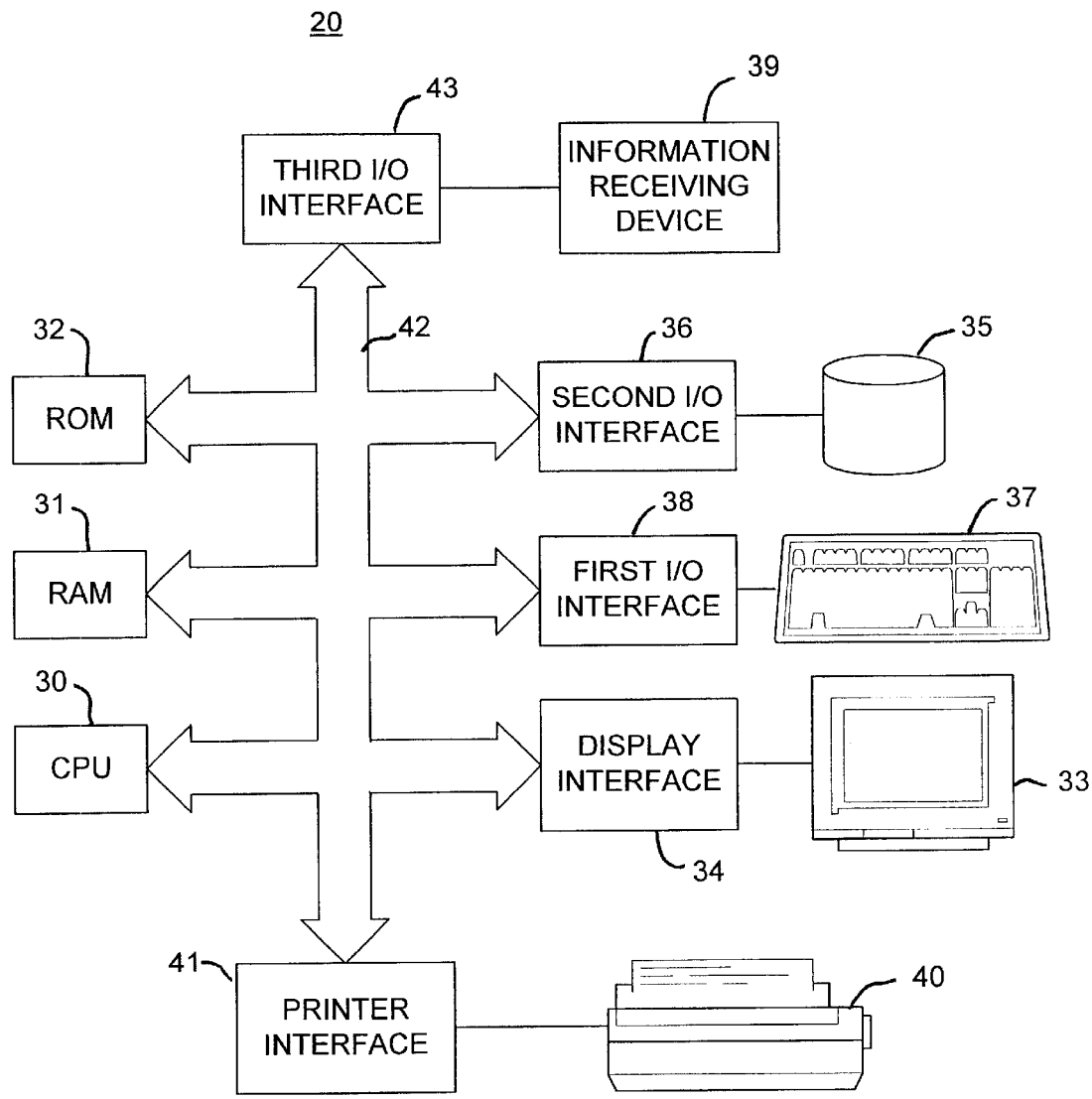
FIG. 1 is a system diagram in block form of a system constructed in accordance with the present invention.

FIG. 1 shows an example of one computer hardware system 20 that may be used, in whole or in part, to implement various features of the method of the present invention. As shown in FIG. 1, computer hardware system 20 includes a central processing unit (CPU) 30; a random access memory (RAM) 31; a read only memory (ROM) 32; a display monitor 33; a display interface 34 connected to display monitor 33; a data storage device 35; a first input/output (I/O) interface 36 connected to data storage device 35; a keyboard 37; a second I/O interface 38 connected to keyboard 37; an information receiving device 39 connected to a third I/O interface 43; a printer 40; a printer interface 41 connected to printer 40; and a system bus 42 for interconnecting CPU 30, RAM 31, ROM 32, display interface 34, first I/O interface 36, second I/O interface 38, and printer interface 41. As described below, information receiver 39 may take any appropriate form for receiving data from the particular form of machine-readable data used for the particular embodiment or for receiving machine-recognizable information that may be processed by a computer. Preferably, data storage device 35 is a computer hard disk drive.

As will be apparent to those of ordinary skill in the art, the components of computer hardware system 20 may be incorporated into a personal computer or a portable laptop computer, with the possible exception of information receiver 39 and printer 40. However, as will become apparent from the following description of the present invention, certain components of computer hardware system 20 may be eliminated depending upon the manner in which it is used within the confines of the present invention. For example, if computer hardware system 20 were used solely for receiving data and displaying the received data, keyboard 37 may be eliminated and printer 40 would become optional, unless one wished to print out information displayed on display monitor 33. By eliminating keyboard 37 and/or printer 40, computer hardware system 20 may be implemented in a very portable, small integral device. Clearly, the particular form taken by computer hardware system 20 will depend upon the manner and environment in which the system is used. Further, computer system 20 may also be configured with a cellular telephone/modem, a global positioning system (GPS), digital camera, facsimile machine, image scanner, DVD drive, CD-ROM drive, fax/modem, or other device commonly used in or with a computer system.

In accordance with the present invention, the ISP component of the present invention is loaded into the host computer system. As described below, the loaded ISP has a defined file configuration. Subsequently, the application software to be populated is loaded into the subject host system. The application software may be any commercially-available application software of the type that is to be populated with data. Such application programs generally include database software (e.g., Microsoft Access® and FoxPro®, Borland Paradox®, etc.) or display screen configuration software. Once both the ISP and the application program are loaded and running, the host system is prepared to accept bar code scans.

Figure 2:
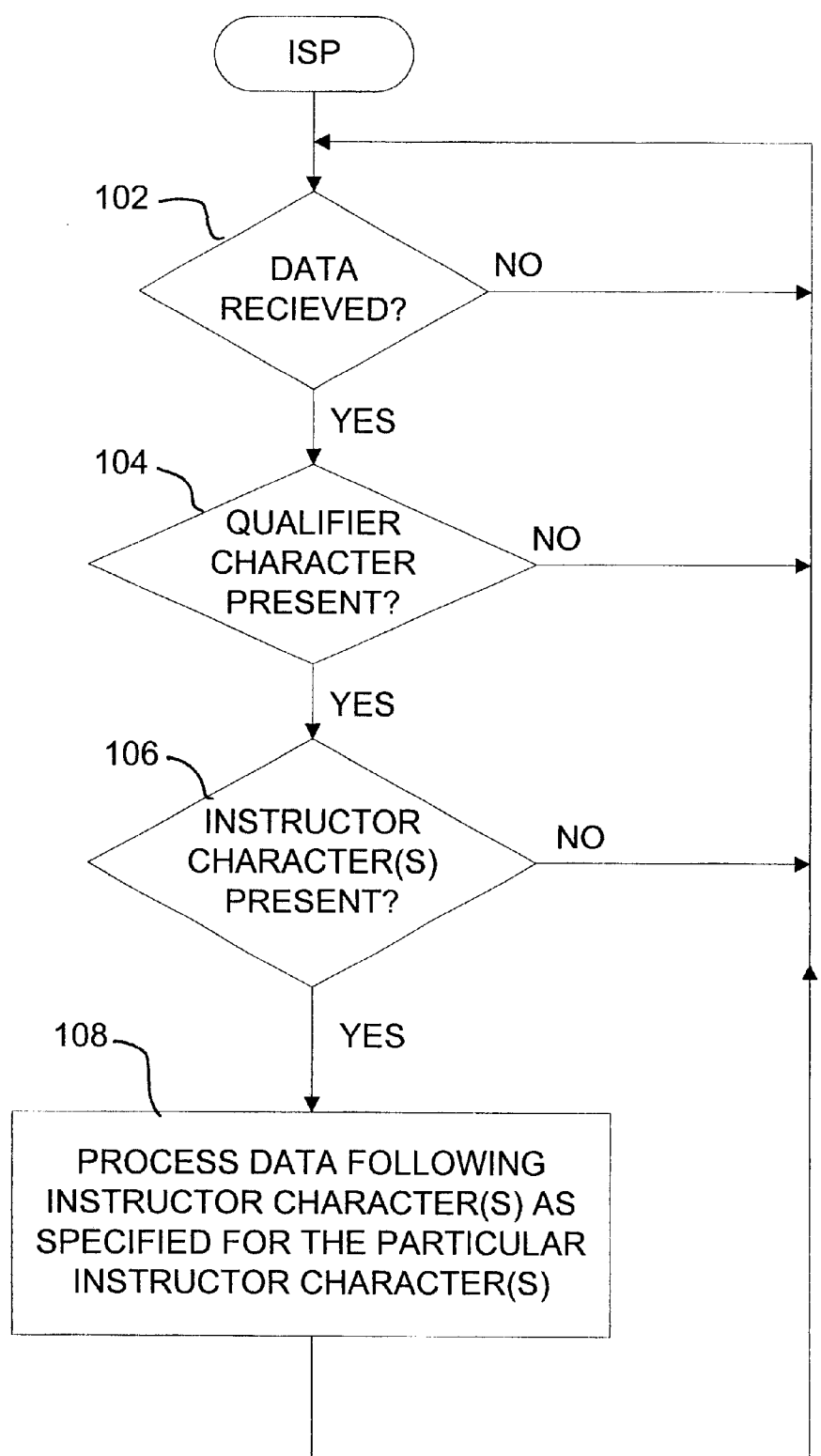
FIG. 2 is a flow chart illustrating the operations performed by the interpretive software program of the present invention.

To illustrate the manner by which the inventive method operates, reference is made to the flow chart shown in FIG. 2, which shows the steps that the ISP is programmed to perform. As shown, the ISP first looks for data received from a communication port of the computer system that is connected to a data reading device, such as a the two-dimensional bar code scanner (step 102). When data is detected, the ISP determines that a bar code or the like has been scanned. When a bar code is scanned, the ISP will search the received data for a QUALIFIER character (e.g., "*") (step 104). If a QUALIFIER character is present, the ISP approves that data as acceptable to the database to be populated. If it is not present, this data will be ignored and the program returns to step 102 where it looks for data from the bar code scanner.

For "approved" data, the ISP next searches for and reads INSTRUCTOR CHARACTERs in the received data (step 106). Depending on the instructions resident in the ISP, the ISP will act on these INSTRUCTOR CHARACTERs to either reformat and/or translate data (e.g., the instructions for a "%" character might be that %="name" and therefore "name" will flow into the database or screen) or place data in a particular field of the database or screen (e.g., the instruction for "~" might be that ~="go home to top of screen" and "$" might be that $="go down one line") (step 108).

Thus, as described above, a two-dimensional bar code (or other media), working in conjunction with the ISP will: (1) accept or refuse data; (2) translate or reformat data; and (3) place data in the appropriate data field. This is all accomplished without modifying the host system database or screens.

The method of the present invention provides the user considerable flexibility. For instance, as described further below, the same bar code can be interpreted by two different ISPs to populate two dissimilar databases or screens. In addition, two dissimilar bar codes (but containing the appropriate QUALIFIER and INSTRUCTOR CHARACTERs) can be interpreted by the same ISP to populate the same database or screen. Once again, this is accomplished without modifying the existing database or screen in any manner whatsoever.

As an example, consider a two-dimensional bar code that contains data on a person's name and address. For a first particular database to be populated, the "name" must populate a data field on the first line of the screen while the "address" populates the second line of the screen. As illustrated in block 200 of FIG. 3A, the data, which is encoded in a two-dimensional bar code or the like, may include a string of AS QUALIFIER CHARACTER ("*") followed by one or more first INSTRUCTOR CHARACTERs ("~", "$", and "%"), an associated first data string for a first data field identified by one of the first INSTRUCTOR CHARACTERs ("%"), one or more second INSTRUCTOR CHARACTERs, a second data string for a second data field identified by one of the second INSTRUCTOR CHARACTERs ("#"). Although not illustrated, the encoded data may include additional INSTRUCTOR CHARACTERs and associated data strings.

Figure 3A:
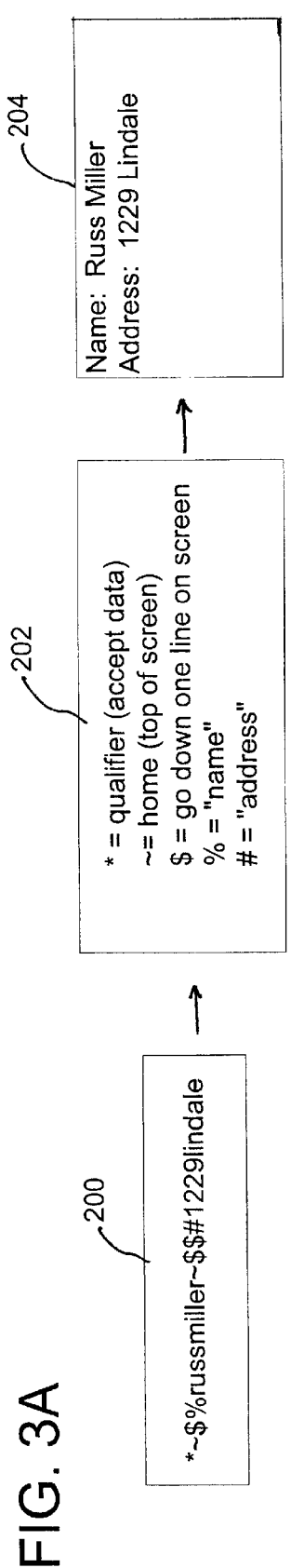
FIGS. 3A through 3C are block diagrams illustrating examples of the operation of the present invention.

As illustrated in block 202, the ISP may be programmed to recognize the QUALIFIER CHARACTER ("*") so as to accept or reject the data that follows, as well as the INSTRUCTOR CHARACTERs ("~", "$", "%", and "#"). As specifically shown in this example, ISP interprets the "~" character as a command to move the computer's cursor to the "home" location (i.e., the top left corner of the display screen) and interprets the "$" character as a command to move the cursor down one line on the screen. The ISP further recognizes the "%" character and uses a predefined association therein to determine that the data string following the "%" character is a "name," as identified in the application database program for a specific data field. Similarly, the ISP can be programmed to determine that the data string following the "#" character is an "address," as identified in the database program for another specific data field. Block 204 of FIG. 3A illustrates how the display screen may be populated using the ISP of block 202 and the data of block 200. Thus, instead of having to move a cursor or program the host software to recognize data identifiers and perform translation and placement functions, the ISP contains instructions to place this data in the appropriate data field.

Figure 3B:
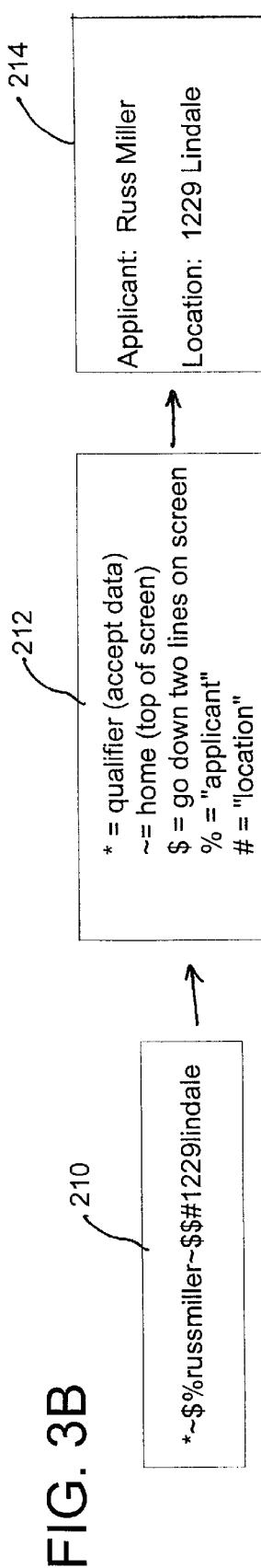

FIG. 3B shows a second example where the same data in the same bar code (block 210) may be used to populate a database that is different from that described above in the first example. For the second database to be populated, one might want to change "name" to mean "applicant" and change "address" to mean "location" and fill different data fields (e.g., second line for applicant and fourth line for location). An ISP (block 212) can be created to perform these functions without having to change the raw data in the bar code (block 210) or modify the receiving database software or screen. Thus, in the second example, the data of bar code 210 may be translated using the ISP parameters shown in block 212 to place the data in the appropriate data fields and locations as shown in block 214.

Figure 3C:
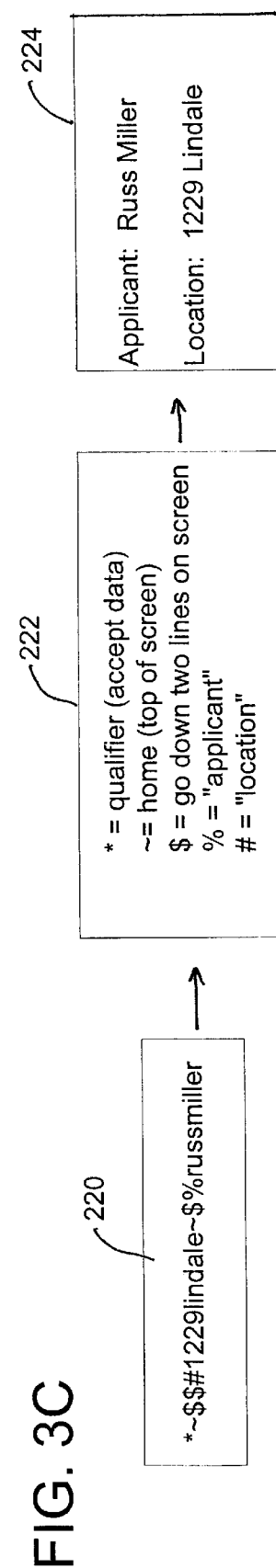

FIG. 3C shows a third example in which data in a different bar code (block 220) is interpreted using the same ISP (block 222) as in the second example to obtain the same results (block 224). As illustrated, the data in the different bar code has the "location" and "applicant" data presented in a reverse order, but the same ISP interprets the data and populates the screen and database in the same manner as in the second example.

Although the present invention has been described as using two-dimensional bar codes, it will be appreciated by those skilled in the art that the inventive methods may be carried out using any other portable high-capacity machine-readable medium. Further, the present invention has been described as using ISPs that recognize specific characters and perform specific functions in response to those characters. However, the present invention may be practiced with the ISP(s) programmed to recognize any character and to perform the above-mentioned functions in response to such characters.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method of populating a database and/or software screen in a computer with data read from portable high-capacity machine-readable media comprising the steps of:

loading and executing an interpretive software program in the computer;

reading a portable high-capacity machine-readable medium with a reading device coupled to the computer; and using the interpretive software program to identify any instructor characters that are present in the data read from the machine-readable medium, and reformat the data in the machine-readable medium that follows the corresponding instructor character in a manner associated with the instructor character.

2. The method as defined in claim 1, wherein said portable high-capacity machine-readable medium is a two-dimensional bar code.

3. The method as defined in claim 1, wherein said instructor characters are ASCII characters.

4. The method as defined in claim 1 and further including the step of using the interpretive software program to identify a data field within the database and/or software screen that corresponds to each identified instructor character, and populate the identified data field with data in the machine-readable medium that follows the corresponding instructor character.

5. The method as defined in claim 1 and further including the step of using the interpretive software program to identify any qualifier character that is present in the data read from the machine-readable medium, ignore the data if no qualifier character is identified, and populate the database and/or software screen with the data read from the machine-readable medium if a qualifier character is identified.

6. The method as defined in claim 5 and further including the step of using the interpretive software program to identify a data field within the database and/or software screen that corresponds to each identified instructor character, and populate the identified data field with data in the machine-readable medium that follows the corresponding instructor character.

7. A method for populating a database and/or software screen in a computer with data read from portable high-capacity machine-readable media comprising the steps of:

loading and executing an interpretive software program in the computer;

reading a portable high-capacity machine-readable medium with a reading device coupled to the computer; and using the interpretive software program to identify any instructor characters that are present in the data read from the machine-readable medium, identify a data field within the database and/or software screen that corresponds to each identified instructor character, and populate the identified data field with data in the machine-readable medium that follows the corresponding instructor character.

8. The method as defined in claim 7, wherein said portable high-capacity machine-readable medium is a two-dimensional bar code.

9. The method as defined in claim 7, wherein said instructor characters are ASCII characters.

10. A method for populating a database and/or software screen in a computer with data read from portable high-capacity machine-readable media comprising the steps of:

loading and executing an interpretive software program in the computer;

reading a portable high-capacity machine-readable medium with a reading device coupled to the computer; and using the interpretive software program to identify any qualifier character that is present in the data read from the machine-readable medium, ignore the data if no qualifier character is identified, and populate the database and/or software screen with the data read from the machine-readable medium if a qualifier character is identified.

11. The method as defined in claim 10, wherein said portable high-capacity machine-readable medium is a two-dimensional bar code.

12. The method as defined in claim 10, wherein said instructor characters are ASCII characters.

13. The method as defined in claim 10 and further including the step of using the interpretive software program to identify any instructor characters that are present in the data read from the machine-readable medium, identify a data field within the database and/or software screen that corresponds to each identified instructor character, and populate the identified data field with data in the machine-readable medium that follows the corresponding instructor character.

14. A system for populating a database and/or software screen in a computer with data read using a reading device coupled to the computer, said system comprising:

a portable high-capacity machine-readable medium representing data having a plurality of characters, said machine-readable medium being in a format that the reading device may read; and an interpretive software program stored in the computer for identifying any qualifier character that is present in the data read from the machine-readable medium, ignoring the data if no qualifier character is identified, and populating the database and/or software screen with the data read from the machine-readable medium if a qualifier character is identified.

15. The system as defined in claim 14, wherein said portable high-capacity machine-readable medium is a two-dimensional bar code.

16. The system as defined in claim 14, wherein said instructor characters are ASCII characters.

17. The system as defined in claim 14, wherein said interpretive software further identifies any instructor characters that are present in the data read from the machine-readable medium, identifies a data field within the database and/or software screen that corresponds to each identified instructor character, and populates the identified data field with data in the machine-readable medium that follows the corresponding instructor character.

18. A system for populating a database and/or software screen in a computer with data read using a reading device coupled to the computer, said system comprising:

a portable high-capacity machine-readable medium representing data having a plurality of characters, said machine-readable medium being in a format that the reading device may read; and an interpretive software program stored in the computer for identifying any instructor characters that are present in the data read from the machine-readable medium, identifying a data field within the database and/or software screen that corresponds to each identified instructor character, and populating the identified data field with data in the machine-readable medium that follows the corresponding instructor character.

19. The system as defined in claim 18, wherein said portable high-capacity machine-readable medium is a two-dimensional bar code.

* * * * *